Aug. 6, 1968     K. A. SCHAFER     3,396,067
RESINOUS PRODUCT SIMULATING ONYX
Filed Dec. 3, 1964
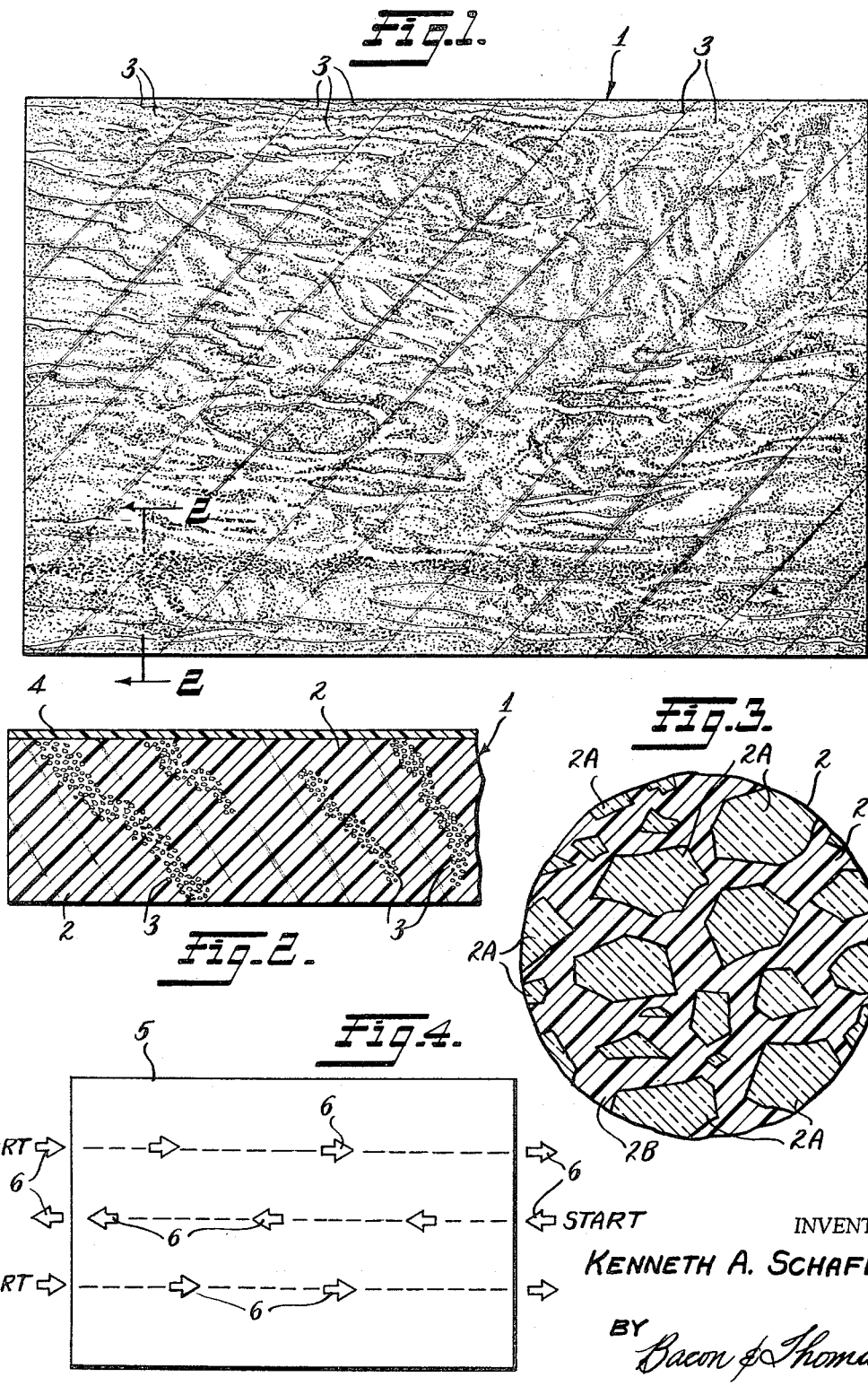
INVENTOR
KENNETH A. SCHAFER
BY
Bacon & Thomas
ATTORNEYS

United States Patent Office 3,396,067
Patented Aug. 6, 1968

3,396,067
RESINOUS PRODUCT SIMULATING ONYX
Kenneth A. Schafer, Pittsburgh, Pa., assignor, by mesne assignments, to Mira Chem, Incorporated, Oakland Park, Fla., a corporation of Delaware
Continuation-in-part of application Ser. No. 296,106, July 18, 1963. This application Dec. 3, 1964, Ser. No. 415,692
10 Claims. (Cl. 161—5)

This application is a continuation-in-part of application Ser. No. 296,106, filed July 18, 1963, now abandoned.

This invention relates to a filled transparent synthetic plastic composition and to the use of that composition in a synthetic plastic structure in which an opaque material is visibly embedded in a filled transparent matrix. More particularly, this invention relates to a simulated onyx material, and to a composition for and method of making the same.

A principal object of this invention is to provide a novel filled synthetic plastic material that has a transparency in depth whereby a product made of the material, while not necessarily fully transparent or even translucent, will be transparent or image transmissive through at least a portion of its thickness.

Yet a further object is to provide a simulated onyx product that has a matrix that is transparent in depth and in which natural-appearing opaque striations are embedded as to be visible in depth through the transparent matrix.

A further object is to provide a simulated onyx of a synthetic plastic composition that includes a substantial amount of a transparent filler material that adds bulk to the product and reduces the cost of materials therein.

A still further object is to provide a novel and simple composition and method for making a simulated onyx.

Other objects and advantages of the invention will become apparent from the following description of a preferred embodiment thereof, taken in conjunction with the appended drawings, in which:

FIGURE 1 is a top plan view of a rectangular slab of a simulated onyx embodiment of the present invention.

FIGURE 2 is a cross section taken on line 2—2 of FIGURE 1.

FIGURE 3 is an enlarged fragmentary sectional view of a portion of the simulated onyx of FIGURE 2.

FIGURE 4 is a diagrammatic view illustrating a preferred method of casting the onyx slab of FIGURE 1.

Generally, the composition according to the present invention comprises a matrix structure and a colored or opaque material visibly embedded in the matrix for decorative or appearance purposes. As a preferred range, the matrix structure includes from 15 to 40 percent by weight of a suitable resin prepared, for example, from a so-called casting resin, such as, a solution of an ethylenically unsaturated polyester or alkyd resin in a liquid monomeric polymerizable compound containing an ethylenic linkage which is a solvent for the polyester and copolymerizes therewith in the presence of a polymerization catalyst to form a transparent solid, and from 60 to 85 percent by weight of a finely divided filler material, that is transparent when embedded in the polymerized resin.

While a wide variety of reasonably clear or transparent thermosetting resins are available as the resinous material for the present composition, resins formed by the copolymerization of styrene and an unsaturated polyester or alkyd resin formed by reacting an $\alpha,\beta$-unsaturated dicarboxylic acid with a glycol are preferred for a variety of reasons including cost, ready availability, low color and ease of handling. Resins of this type are fully described by the U.S. patent to Carleton Ellis, No. 2,255,313.

Polyester resins are exceedingly well known, and are described in standard plastics texts, such as "Modern Plastics Encyclopedia issue for 1961" as the polycondensation products of dicarboxylic acids with dihydric alcohols, and depending on the choice of raw materials or how the resin is manufactured, polyesters can be formulated to meet any one of a wide range of special needs. More particularly, unsaturated polyester resins are created by reacting a dihydric alcohol and a dibasic acid, either or both of which contain a double-bonded pair of carbon atoms. The alcohol and the acid are heated to sufficiently high temperatures to react, split out water, and form ester linkages. The double bonds in the unsaturated polyester resin thus formed render the material capable of subsequent cross-linking, which is generally accomplished by reacting the unsaturated polyester resin with a polymerizable monomer, such as styrene, under the influence of a special catalyst, for example an organic peroxide, such as methyl ethyl ketone peroxide. In the reaction, the double bonds of the unsaturated polyester resin connect with those of the monomer, in what is described as copolymerization or cross-linking, to form a thermoset which, when fully cured, is insoluble and infusible. The glycols of ethylene, propylene, 1,3- and 2,3-butylene, diethylene, and dipropylene are common examples of the dihydric alcohols that are used, while maleic anhydride and fumaric acid are examples of commonly used unsaturated dibasic acids. The properties of the thermoset resin may be modified by replacing a portion of the unsaturated dibasic acid with a saturated or aromatic dibasic acid and as examples of such acids, there may be mentioned isophthalic acid, adipic acid, azelaic acid and phthalic anhydride.

Quite normally, polyester formulations include an inhibitor, which is usually a polyhydric phenol, such as hydroquinone tertiary butyl hydroquinone, to stabilize the polyester solution for storage at ordinary temperatures, while the copolymerization curing of the resin is initiated by the addition of a small amount, ranging from about one-half to one percent based on the weight of the casting resin, of a catalyst such as methyl ethyl ketone peroxide, and while the cure of the resin is promoted by an accelerator such as cobalt naphthenate to promote the cross-linking reaction so that cure can be effected at room temperatures or in shorter times at higher temperatures.

As indicated above, it is also common industry practice to vary the resin formulation to control the characteristics of the final resin, as is discussed in "Modern Plastics Encyclopedia for 1964," such as by using maleic anhydride as an unsaturated acid together with phthalic anhydride as a saturated acid, and by varying the ratio between the two while maintaining the total mols of acid constituents balanced stoichiometrically with a glycol, which, however, is used in slightly excess amounts to compensate for losses during the polyesterification process. For example, a high maleic content increases the resin reactivity and promotes rigidity at high temperatures, whereas a high phthalic anhydride content gives a less exothermic resin with lower high-temperature rigidity. Depending on the properties desired, as high as two mols of saturated or aromatic acid may be used for each mol of unsaturated acid.

While styrene is the most commonly used monomer for reaction with the linear unsaturated polyester to achieve a 3-dimensional structure when cured, other examples of suitable unsaturated monomers are diallyl phthalate, vinyl toluene, methyl methacrylate and triallyl cyanurate.

Additionally, it is common practice to provide a very smooth protective surface on a molded part by use of a gel coat, although castings may be made with or without the use of such a gel coat. The purpose of the gel coat is to provide a clear, stain resistant, film on the surface of the casting, and is generally described in plastics handbooks as being a conventional polyester resin containing flow control agents so that it can be used to lay down a clear, uniform film of resin on a mold that may or may not have been previously waxed. The gel coat is usually sprayed on or otherwise applied as a thin uniform layer on the mold surface prior to pouring of the casting resin. While the casting resin that is to be used to make a product may be used, but without filler, as the gel coat resin, suitable gel coats are also commercially available under such brand names as "Gel-Kote" (Glidden Company), "Laminac" (American Cyanamid Company), "Plaskon" (Allied Chemical and Dye Company), and others.

The following examples will illustrate suitable casting resin embodiments for use in practicing the present invention:

EXAMPLE 1

|  | Grams |
|---|---|
| Maleic anhydride (10 mols) | 980 |
| Dipropylene glycol (11 mols) | 1476 |

The above reactants are processed conventionally, as described in "Modern Plastics Encyclopedia for 1964," in a reactor wherein the reaction mass is brought to top heat of 200 to 215° C. in a period of one hour, with the temperature being maintained at that level for an additional three hours until attainment of proper molecular weight and specifications. During the esterification, the water that is produced is discarded while the glycol is retained in the reactor. The batch is then cooled to 80° C., and is inhibited, such as by the addition of sufficient tertiary butyl catechol to make 140 parts per million based on the total weight of polyester and styrene, and dissolved in sufficient styrene monomer to produce a solution having a viscosity of 800 to 2000 centipoises at 25° C. For a solution having a viscosity on the order of 350 centipoises Brookfield at 25° C., such solution of lesser viscosity being preferred for use in the present invention, the polyester should be dissolved in one-third additional styrene. Castings may be made from this resin by catalyzing it with 2 percent methyl ethyl ketone peroxide (60 percent in dimethyl phthalate) and by use of trace quantities such as .02 percent, of cobalt naphthenate (6 percent metal) as an accelerator. The range of cobalt naphthenate suitable for the present resin when filled, ranges from .010 percent, at which level the cobalt naphthenate will only begin to accelerate the cure, to .032 percent, at which level the cobalt naphthenate will substantially accelerate the cure time but will begin to impart unwanted blue color to the casting. A cured casting of this resin when diluted with styrene to a viscosity of 350 centipoises Brookfield at 25° C., will have an index of refraction of 1.5320 when measured at 20° C. using the sodium D line.

EXAMPLE 2

|  | Grams |
|---|---|
| Maleic anhydride (5 mols) | 490 |
| Phthalic anhydride (5 mols) | 740 |
| Propylene glycol (11 mols) | 836 |

The above resin was processed as described for Example 1 above, and, when diluted with styrene to a viscosity of 350 centipoises Brookfield at 25° C., produced a cured casting having an index of refraction of 1.5645 at 20° C. using the sodium D line.

Commercial versions of the above Example 1 and Example 2 resins are readily available from plastic suppliers, although these resins are normally supplied in quite viscous (i.e., 2700 centipoises) form, and will require dilution with styrene to give a viscosity range from the as-received viscosity to 100 centipoises, with about 350 centipoises being preferred, which dilution will be attended by a resultant lowering of the refractive index of the resin. After the sample measurement of the resin, the resin can be matched with a suitable filler, or can be adjusted as to refractive index to properly match the refractive index of a selected filler by use of more or less styrene or by combination of the resin with another polyester resin of different refractive index.

As a commercial example of one such suitable casting resin, available from Reichhold Chemicals, Inc., of White Plains, N.Y., there is the Reichhold Polylite resin HU–166, which is a styrene-modified polyester of the rigid medium-reactivity type, that is pre-accelerated for room temperature curing and that a viscosity of 300–360 centipoises Brookfield at 25° C. A commercially available casting resin that is substantially the equivalent of the Example 2 resin described above, is available from Freeman Chemical Corporation of Port Washington, Wis., a subsidiary of H. H. Robertson Company of Pittsburgh, Pa., under the identification of Stypol 40–2417 polyester resin, a styrene-modified polyester of the rigid medium-reactivity type having a viscosity at 25° C. of 2700 centipoises Brookfield, and which when diluted with 20 percent added styrene monomer to a viscosity of 350 centipoises Brookfield at 25° C. will have a refractive index, when cured, of 1.5645.

The criteria for resin selection include appropriate selection for water-whiteness or absence of color, selection for appropriate match of refractive index with that of the filler, and selection for appropriate physical and chemical characteristics. Consideration should also be given to the fact that the use of additional polymerizable monomer, such as styrene, will not only shift the refractive index of the polyester resin, but may also affect other properties of the resin, i.e., the less additional styrene that is used, the less will be the resultant shrinkage in a cured casting, and the less the shrinkage, the less the resultant change there will be in refractive index between the resin in its uncured and cured states.

The resinous material is filled and given bulk by a finely divided filler that may be inert or reactive and that, for the purpose of the present invention, has particular properties in terms of physical characteristics as well as physical state. In terms of physical characteristics, the filler is substantially colorless and transparent and has an index of refraction substantially the same as that of the resinous material in its polymerized or cured state. Since polyester resins have indices of refraction ranging from about 1.523 to 1.57, the filler material should also have a refractive index falling within that range.

In terms of physical state, the filler material is finely divided, preferably of a mesh size of 100 or finer, and the finely divided particles are of sharp or rough multi-faceted configuration, rather than of smooth or rounded surface configuration. Particle size is important, for notwithstanding the selection of a transparent filler material and a proper matching of the index of refraction of the filler material to that of the resinous material, as the filler particle size increases, the particles become more visible within the resinous material, with an attendant reduction in the degree of transparency of the ultimate product. Similarly, the physical shape or configuration of the particles influences transparency, and while fillers that comprise rounded particles will produce a composition that pours and flows readily, faceted transparent particles are less visible within a resinous binder.

Examples of suitable materials for inert fillers include finely divided silica flour, frit, glass flour, Norwegian quartz flour, and onyx flour, while examples of reactive fillers include transparent powdered thermoplastics that partially soften and then reharden with the binder resinous material when added to a mix of a casting resin and silica flour. A preferred silica filler material that has produced excellent results in combination with the Reichhold Polylite HU–166 resin described above is a 200 mesh Holly brand silica that is distributed by National Glass Sand Corporation of Millville, N.J.

The finely divided frits that may be employed in accordance with the present invention may be one or more of the many that are commercially available, such as are commonly employed in the glazing of chinaware. Suitable finely divided commercial frits that produce satisfactory water-white castings in one of the above-described resins, are frits Nos. 3134 and 3278 of the Ferro Corporation of Cleveland, Ohio, these frits being soda-lime boro silicates that will fuse at about 1400° F. The frits may be from 100–200 mesh in fineness, rather than from 160–200 mesh fineness as with the silica screenings, inasmuch as the use of frit a a filler lends itself to the coarser, i.e., 100 mesh screenings which in turn permit a higher filler loading since the larger particles will present a smaller surface area that must be wet by the resin to achieve desired transparency. The 100 mesh frit particles can be described as being rough, sharp-edged, multi-faceted, dry, colorless, amorphous particles having a gradation of sizes up to a maximum diameter of .0059".

A semi-quantitative spectrographic analysis of the Ferro frits Nos. 3134 and 3278 is as follows:

| Range | 3134 | 3278 |
|---|---|---|
| Major, Greater than 10%. | $SiO_2$, $B_2O_3$, CaO | $SiO_2$, $B_2O_3$, $Na_2O$. |
| Near Major, 5–25% | $Na_2O$ | CaO. |
| Near Minor, .5–5% | $Al_2O_3$ | $Al_2O_3$. |
| Near Low, .05–.5% | | MgO. |
| Very Low, .01–.1% | $TiO_2$, $K_2O$ | $Fe_2O_3$, $K_2O$. |
| Strong Trace, .005–.05%. | $Fe_2O_3$, MgO, SrO | $TiO_2$, MnO, $ZrO_2$, PbO, SrO. |
| Trace, Less than .01% | MnO, $Li_2O$, BaO, $ZrO_2$, NiO. | $Li_2O$, BaO. |
| Not Detected | Cu, Cr, V, Bi, Mo, Pb, Sn, Ag, Co, Sb, As, Zn, Cd, Cb, W. | CuO, Ni, Cr, V, Bi, Mo, Sn, Ag, Co, Sb, As, Zn, Cd, Cb, W. |

The general criteria for filler-selection include selection for water-whiteness or appropriate absence of color when embedded in a cured resin, selection for particle size to permit a desired filler loading and to provide a desired resultant transparency when in a cured resin, and selection for matched refractive index with that of the resin. It must be borne in mind that while the use of extremely coarse fillers will reduce the resultant transparency of a filled resin, the use of very small amounts of coarse frits along with the general finer filler for the resin, will give the product a changed appearance to include apparent "shatter" lines by "tearing" the resin mass to a limited degree as it passes over the lip of the pouring container. An even further consideration with respect to the quantity of filler used, is that the less the quantity of filler, the less critical is any mismatch of the refractive indices of the filler and the resin. While it is standard industry practice to use somewhat less than 33 percent by weight of filler in a standard reinforced plastic system using a fibrous filler, and up to about 40 percent by weight when a so-called bulk filler is used, the present invention comprises the use of even higher filler loadings not only to reduce the final cost of the product, but also to add to its weight and density, to reduce the tendency of the final product to stratify during molding, to reduce the tendency of the final product to warp such as occurs when low filler concentrations are used and where filler settling will occasion a stratified or non-homogeneous product, to increase the heat resistance of the final product, to increase the dimensional stability of the product over a wider temperature range, to reduce the shrinkage of the product during curing, and to generally improve the product in terms of creating a harder, more rigid casting of greater flexural strength.

A specific example of a silica-filled composition according to the present invention that has transparency in depth is prepared by mixing 27.5 percent by weight of Reichhold Polylite HU–166 resin, with one-half to one percent methyl ethyl ketone peroxide added thereto, and 72.5 percent by weight of 200 mesh Holly brand silica flour. This mixture may be slightly tinted, as desired, and is thoroughly mixed for about five minutes, whereupon it is poured into a clean mold that may be waxed or treated with a thin transparent gel coat. Upon curing or polymerization of the resinous material, a product results that has a controlled degree of transparency in depth depending upon the transparency of the resinous material and of the filler material, the size and physical shapes of the filler material, and the extent to which the indices of refraction of the resinous material and the filler material are matched.

A specific example of a frit-filled composition according to the present invention that has transparency in depth, is prepared by mixing about 30 percent by weight of the resin described in Example 1 above, with about 70 percent by weight of 160 mesh Ferro No. 3278 frit, 2 percent methyl ethyl ketone peroxide (60 percent in dimethyl phthalate) as a catalyst, and 0.02 percent cobalt naphthenate (6 percent metal) as an accelerator. This mixture may be slightly tinted, as desired, and after thorough mixing may be poured into a clean mold that may have been prepared with a mold wax and/or a thin transparent gel coat. Upon curing or polymerization of the resinous material, a product results that has a pleasing substantial transparency in depth.

An additional specific example of a frit-filled composition according to the present invention is prepared by mixing about 33⅓ percent by weight of the resin described in Example 2 above, 66⅔ percent by weight of Ferro No. 3134 frit, 2 percent methyl ethyl ketone peroxide as a catalyst, and 0.02 percent cobalt naphthenate. This mixture may be tinted and poured as the previous examples.

The range of proportions of filler and resin in the composition may be varied widely, it being possible to use from 10 to 90 percent filler. The use of the lower amounts of filler will give a greater resultant transparency, but fails to improve the product in terms of lowered cost or increased strength, while also creating the problem of filler settling. On the other hand, the use of the higher amounts of filler makes pouring and air bubble removal difficult, although these can be effected by compression molding and by vacuum degassing.

The deep transparency of a product prepared as described above lends itself to the novel embedment of decorative elements within a matrix of the cured resinous material so as to be visible under the surface of the latter. One such particularly appealing decorative product is a simulated onyx that has a transparency in depth through which natural-appearing relatively opaque or colored veins or striations are visible, which striations may be completely under the surface of the resinous matrix, or may extend from below that surface to the surface, rather than existing and being visible solely on the surface.

As illustrated in FIGURES 1 and 2, a simulated onyx embodiment of the present invention comprises a rectangular slab generally designated by the numeral 1 and includes a matrix portion 2 comprising a transparent polymerized resinous material and particles of a finely divided transparent filler material, the refractive indices of the resinous material and filler being matched so that the entire matrix has transparency in depth. This transparency makes visible generally parallel colored striations or trace lines 3 composed of an opaque finely divided filler, the nature of which will be described below. As stated earlier, the simulated onyx slab may be prepared with a thin transparent gel coat surface layer 4 which is shown in exaggerated thickness.

The greatly enlarged fragmentary view, FIGURE 3, shows the nature of the particles 2A of the matrix 2 in their preferred form and their relation to the resinous material 2B. As will be seen, these particles have a somewhat spherical overall shape rather than being flat flakes or platelets but have sharp-edged, multi-faceted surfaces. The transparent filler particles are distributed in random fashion throughout the resinous material and it will be noted that there will be gradation of sizes of particles present up to the maximum size that will pass through the sieve of selected mesh.

An opaque or colored mix for veining or striation purposes is prepared with about 27.5 percent of a casting resin, which preferably is the same as that used in the matrix composition with a minor amount of a polymerization catalyst, such as methyl ethyl ketone peroxide, and about 72.5 percent of a filler, which should be opaque and may be a finely divided calcium carbonate, such as the 325 mesh calcium carbonate being distributed under the brand Snowflake by Thompson, Weinman & Company of New York, N.Y. Additionally, suitable pigments or color concentrates are added to the striation mix.

The opaque or colored striation mix is carefully added to the matrix mix as to be just barely stirred therethrough, and the dual mixture is thereupon poured into a receiving mold that may include a transparent gel coat as hereinbefore discussed. If desired, different striations of differing colors may be added to the matrix mix, although these should be added separately and carefully so as not to disperse any of the striations. One effective manner of blending the striations into the mix is by the use of a small batch mixer of the type that includes a separable five gallon drum pail, means for supporting the pail at an angle with the vertical and for rotating the pail about its longitudinal axis, and a non-rotating mixing blade that is supported in radial orientation within the pail and that is movable radially within the pail between a central position along the axis of the pail in which position rotation of the pail causes the blade to push the mix out to the periphery of the pail, to an outer blade position where one edge of the blade is adjacent the pail side and in which position the blade is directly in the path of movement of the mix. After the matrix mix has been thoroughly blended in the mixer, an opaque colored striation is added by bringing the mixer blade to its center position and moving its slowly to its outer position as the striation mix is slowly being added and as the pail is being rotated at moderate speed. The rotation of the pail is stopped immediately on the completion of the incorporation of the striation mix, and the dual mix is ready for pouring. Additional colors of striation mixes are added separately in the same manner as the first striation mix, and should be used to more completely simulate natural onyx, which normally includes striations of more than one color.

A simulated onyx slab, such as that illustrated by FIGURE 1, with elongate, generally parallel striations may be formed as is diagrammatically illustrated in FIGURE 4. The dual mixture is poured into a shallow rectangular box mold 5 of from about one-half to one inch depth. As indicated by the arrows 6, the pour is started outside of one end of the mold, continues completely through the extent of the mold and terminates beyond the second end of the mold to impart an elongate continuity to the striations and the prevent the striations from assuming a non-natural swirled pattern at the mold ends. If the mold is of substantial width, it may be necessary to pour several parallel strips of the dual mixture to introduce sufficient material into the mold. Each poured strip of material flattens and spreads laterally, which spreading may be accelerated by vibrating the mold. While the random but gentle incorporation of the striation mix or mixes into the matrix mix will result in natural-appearing irregular striations in the poured product, the natural irregularity may be enhanced by a pouring of the strips in a hesitating or slightly wavering manner.

When it is desired to produce a flat slab of simulated onyx with an intermediate opening for use such as for a lavatory counter or top, a core or insert of the desired opening configuration is positioned in the mold and the strips of the dual mix are poured continuously across the open mold and also the insert, to produce a simulation of the continuously extending veining or striations in natural onyx, and to produce a natural-appearing product that conveys the impression that its intermediate opening was cut through from a solid slab.

When the present invention is related specifically to simulated onyx material and products, the following combinations of colors will produce the most naturally appearing product:

(1) A natural or slightly amber colored matrix, with tan and white striations.

(2) A natural or slightly amber colored matrix with raw turkey umber and tan striations.

(3) An olive green tinted matrix with olive green and white striations.

(4) A rust red tinted matrix with raw turkey umber and white striations.

(5) A black tinted matrix with green and white striations, the black tinted matrix employing finely divided (i.e., 200 mesh) g–6 soda lime glass distributed by Potters Bros. Inc., of Carlstadt, N.J., in place of silica flour and a coloring material to maintain a higher degree of tinted transparency in the matrix than is normally possible when a black pigment is used.

The present invention is particularly adapted to the manufacture in their final forms of a range of articles normally made of natural stone or onyx, such as bases for writing instrument desk sets, tops for tables and other items of furniture, apertured and solid lavatory and counter tops, decorative wall and floor panels and the like. Products made by the present method with the present composition exhibit a particularly appealing transparency in depth beyond the surface of the product, and may include visibly embedded opaque or colored striations in close simulation of natural transparent materials. The production of this dual phase material, i.e., a transparent matrix with an opaque embedment, is nevertheless effected by a simple, single-pour method, and does not require multiple-pours of alternating transparent layers and opaque or colored embedment layers.

While a preferred embodiment of the invention has been described in detail, it will be obvious that changes and modifications may be made in that embodiment without departing from the scope of the appended claims.

I claim:

1. A manufactured product comprising:
    a monolayered solid matrix of a transparent thermoset copolymer of an ethylenically unsaturated polyester and a compatible liquid monomeric polymerizable compound containing an ethylenic linkage and a finely divided transparent inorganic filler homogeneously embedded in said thermoset copolymer, the indices of refraction of said copolymer and said filler being matched so that the filler is invisible, said filler being of a gradation of particle sizes up to the maximum size which will pass through a sieve of 100 mesh; and
    an opaque finely divided filler visibly embedded in said matrix in the form of separated striations irregularly arranged in depth.

2. The product of claim 1, wherein there is present from 15 to 40 percent of said copolymer and from 60 to 85 percent of said transparent filler based on the combined weight of copolymer and transparent filler.

3. The product of claim 2, wherein the transparent filler is in the form of multi-faceted particles.

4. The product of claim 3, wherein the transparent filler is silica flour.

5. The product of claim 3, wherein the transparent filler is frit.

6. The product of claim 2, wherein the opaque filler is distributed in said matrix to form generally parallel striations.

7. The product of claim 6, wherein the opaque filler is an inorganic material.

8. The product of claim 7, wherein the opaque filler is calcium carbonate.

9. The product of claim 6, wherein said matrix also contains a coloring medium.

10. The product of claim 2, wherein the product is faced with a smooth transparent gel coat layer.

References Cited

UNITED STATES PATENTS

| | | |
|---|---|---|
| 2,265,226 | 12/1941 | Clewell et al. |
| 3,135,643 | 6/1964 | Michl _____ 161—79 |
| 3,150,032 | 9/1964 | Rubenstein _____ 161—5 X |
| 3,186,866 | 6/1965 | Claeys _____ 161—6 X |

JACOB H. STEINBERG, *Primary Examiner.*